United States Patent [19]
Koike et al.

[11] Patent Number: 6,037,745
[45] Date of Patent: Mar. 14, 2000

[54] BATTERY CHARGER WITH MONITOR AND PROTECTION CIRCUITS

[75] Inventors: Yasuhiro Koike; Seiki Sakata; Yoshiaki Ishihara; Kazuki Najima, all of Kariya; Tomotaka Kurozu, Chigasaki; Masayuki Fukuda, Tokyo; Hajime Satoh, Hadano, all of Japan

[73] Assignees: Kabushiki Kaisha Toyoda Jidoshokki; Nissan Motor Co., Ltd., both of Japan

[21] Appl. No.: 09/108,761

[22] Filed: Jul. 1, 1998

[30] Foreign Application Priority Data

Jul. 3, 1997 [JP] Japan .................................. 9-178224

[51] Int. Cl.[7] .......................... H01M 10/46; H01M 10/44
[52] U.S. Cl. .............................. 320/104; 320/134
[58] Field of Search .................... 320/127, 128, 320/134, 135, 136, 149, 163, 104

[56] References Cited

U.S. PATENT DOCUMENTS 4,742,290  5/1988  Sutphin et al. .................. 320/149
5,157,319  10/1992  Klontz et al. .
5,568,036  10/1996  Hulsey et al. .

FOREIGN PATENT DOCUMENTS 2-303329  12/1990  Japan .
3-284135  12/1991  Japan .
07039077  2/1995  Japan .

OTHER PUBLICATIONS

SAE International, "Electric Vehicle Inductive Coupling Recommended Practice," from handbook entitled *SAE Ground Vehicle Standards Index*, Feb. 1, 1995, pages cover, index and 1–28.

*Primary Examiner*—Edward H. Tso
*Attorney, Agent, or Firm*—Woodcock Washburn Kurtz Mackiewicz & Norris LLP

[57] ABSTRACT

A charging apparatus for charging batteries of automobiles includes an inverter for converting the direct current from a direct current power source into an alternating current and a transformer having a first coil and a second coil. When an alternating current from the inverter is applied to the first coil, the second coil produces an alternating voltage. A capacitor is connected between the terminals of the second coil to increase the alternating voltage produced in the second coil. A rectifier circuit rectifies the alternating voltage increased in the booster circuit into a direct current voltage and the direct current voltage is applied to the battery. Two transistors, which function as a short circuit, are provided in the rectifier circuit. When the direct current voltage from the rectifier circuit is equal to or higher than a predetermined permissible value, a drive signal from a drive circuit turns on the two transistors. Then, the terminals of the second coil are short-circuited and the voltage applied to the terminals instantaneously turns null. This protects the elements forming the charging apparatus from high voltage.

18 Claims, 4 Drawing Sheets

BATTERY CHARGER WITH MONITOR AND PROTECTION CIRCUITS

BACKGROUND OF THE INVENTION

The present invention relates to a charging apparatus and a charging method for charging batteries of, for example, electric vehicles. More particularly, the present invention pertains to a charging apparatus and charging method that prevent an abnormal increase of voltage when charging a battery.

FIG. 4 is an electric circuit diagram of a known charging apparatus for electric vehicles. The charging apparatus includes a direct current power source E, an inverter 11, a transformer T, and a rectifier circuit 12. The inverter 11 converts a direct current from the power source E to an alternating current. The transformer T includes a first coil T1 and a second coil T2. When a direct current is applied to the first coil T1 from the inverter 11, an induced electromotive force is generated in the second coil T2. The rectifier circuit 12 rectifies the induced electromotive force, which is an alternating voltage, to a direct current and then delivers the direct current to a battery B installed in the electric vehicle (not shown). As a result, the battery B is charged.

The direct current power source E, the inverter 11, and the first coil T1 function as a first circuit and are provided, for example, in a charge control box (not shown) located on the ground. The rectifier circuit 12 and the second coil T2 function as a second circuit and are provided in the electric vehicle. The control box includes a coupler having the first coil T1, and the electric vehicle includes a coupler having the second coil T2. The couplers are detachably coupled. When the couplers are coupled, the first coil T1 faces the second coil T2 in a contactless state. The battery B is charged in this state. Since charging is performed through the coils T1, T2, which are not in contact, the above described charging apparatus is called a non-contact charging apparatus.

It is generally known that the lower the frequency of alternating current generated by the inverter 11 is, the greater the power of the direct current produced in the rectifier circuit 12 is. Accordingly, it is necessary to vary the frequency of the alternating current generated in the inverter 11 in a wide range so that the value of the direct current power delivered to the battery B is varied over a wide range. To achieve this, it is necessary to control the ON/OFF cycle of switching transistors in the inverter 11 over a wide range. This increases the burden on the control apparatus controlling the inverter 11. Also, to handle alternating currents having a wide range of frequencies, a large transformer T must be used.

To solve this problem, as shown by dotted lines in FIG. 4, a capacitor C is connected between the terminals of the second coil T2. The capacitor C functions as a booster circuit that increases the induced electromotive force generated in the second coil T2. Also, the capacitor C and a reactor L are serially connected to the first coil T1 and form a resonance circuit. The resonance circuit is capable of widely varying the direct current voltage obtained by the rectifier circuit 12 by simply varying the frequency of alternating current generated by the inverter 11 in a narrow range, more specifically, in a low frequency range.

Japanese Unexamined Patent Publication No. 2-303329 describes a charging apparatus including a circuit breaker in the second circuit. The circuit breaker disconnects the rectifier circuit and the battery when an excessive amount of current flows from the rectifier circuit to the battery. In the conventional apparatus shown in FIG. 4, also, a fuse F that serves as a circuit breaker is provided between the rectifier circuit 12 and the battery B. Further, a relay (not shown) is serially connected to the battery B. If the fuse F or the relay is cut off during charging, the output voltage of the rectifier circuit increases immediately (in about 100 microseconds). This is because the output voltage of the rectifier circuit 12 is increased when the induced electromotive force generated in the second coil T2 is increased in the capacitor C.

Suppose, for example, the ratio between the number of turns of the first coil T1 and the number of turns of the second coil T2 is one to one, the alternating voltage generated in the inverter 11 is 400V, and the output voltage of the rectifier circuit 12 is 420V to 430V. When the fuse F is cut off in this case, the output voltage of the rectifier circuit 12 instantaneously goes up to 800V to 900V. The high voltage may be beyond the voltage resistance of the elements constituting the second circuit, that is, a diode in the rectifier circuit 12 or a smoothing capacitor C5 that is located between the rectifier circuit 12 and the battery B.

Japanese Unexamined Publication No. 7-39077 discloses a charging apparatus that sends the operation condition of the second circuit to the first circuit by optical communication and that controls the operation of the first circuit in accordance with the operation condition of the second circuit. This kind of charging apparatus permits stopping the operation of the first circuit when the fuse F is cut off in the second circuit. However, the operation of the first circuit is stopped in response to the cutoff of the fuse F, and this is too slow to prevent an abnormal increase of voltage in the second circuit.

It is possible to provide a switch for cutting off the rectifier circuit 12 from the second coil T2 when a high voltage is generated by the cutoff of the fuse F. However, even using the switch, a high voltage is applied to the capacitor C that is a booster circuit.

SUMMARY OF THE INVENTION

The present invention is designed to solve the above problems. The objective of the invention is to provide a charging apparatus and a charging method that prevent an abnormal increase of voltage during charging.

To achieve the above objective, the present invention provides a charging apparatus for charging based on an alternating voltage produced in a second coil of a transformer. The second coil include a pair of terminals. A booster circuit is connected between the terminals of the second coil for increasing the alternating voltage produced in the second coil. A rectifier circuit rectifies the alternating voltage increased in the booster circuit to a direct current voltage for charging. A monitor monitors the direct current voltage from the rectifier circuit and outputs a drive signal when the direct current voltage is equal to or higher than a predetermined permissible value. A short circuit short-circuits the terminals of the second coil in response to the drive signal from the monitor.

The present invention also provides a method for charging batteries based on an alternating voltage produced in a second coil of a transformer. The second coil includes a pair of terminals. The method includes steps of increasing the alternating voltage produced in the second coil by a booster circuit and rectifying the alternating voltage increased in the booster circuit into a direct current voltage by a rectifier circuit. The rectifier circuit applies the direct current voltage to the battery for charging. The method further includes a step of short-circuiting the terminals of the second coil when the direct current voltage from the rectifier circuit is equal to or higher than a predetermined permissible value.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 4:
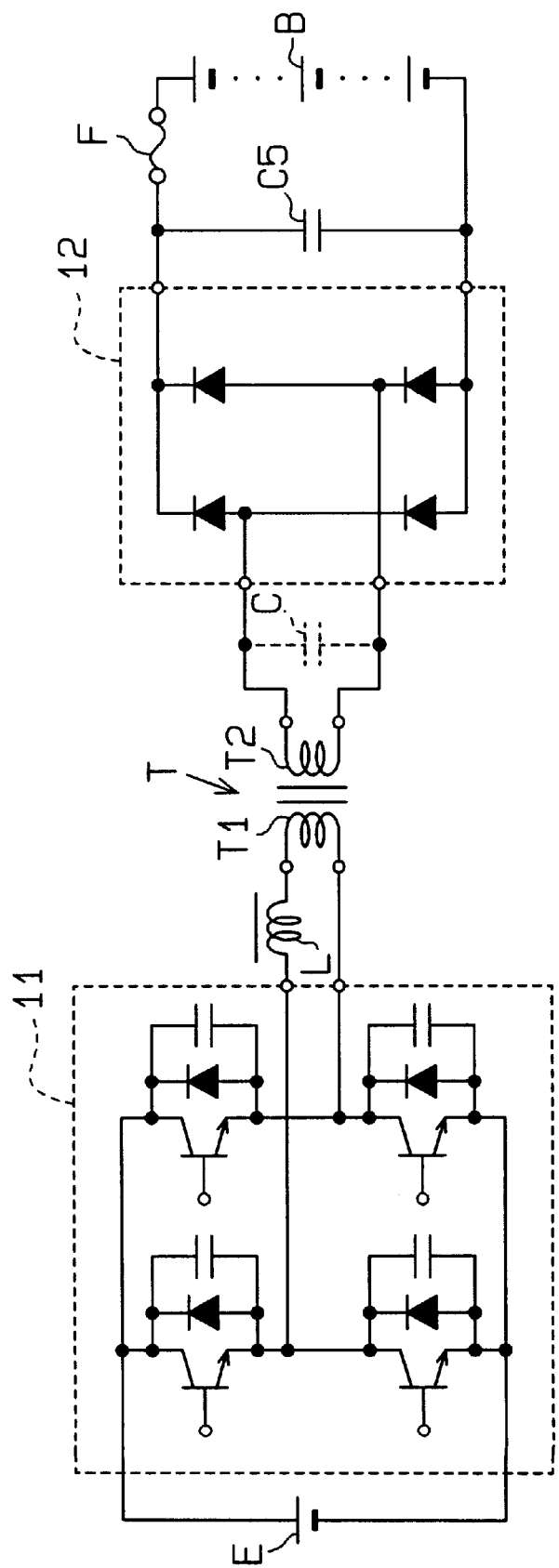
FIG. 4 is a circuit diagram showing a conventional charging apparatus.

A first embodiment of the present invention will now be described in reference to FIGS. 1 and 2. In this embodiment, like numerals are used for members similar to those of FIG. 4.

Figure 1:
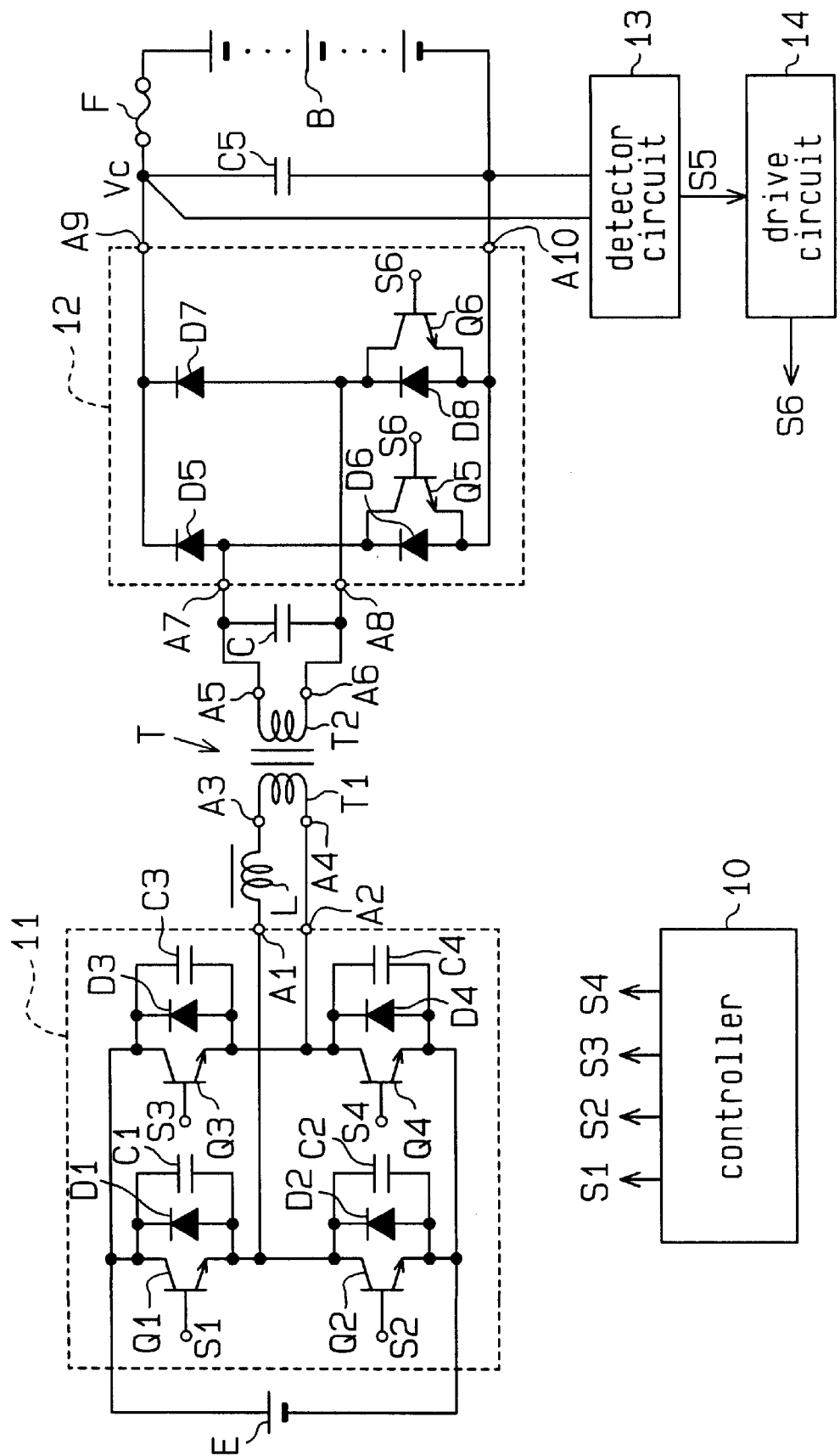
FIG. 1 is a circuit diagram of a charging apparatus according to a first embodiment of the present invention.

As shown in FIG. 1, a direct current power source E is connected to an inverter 11. Although the construction of the power source E is not shown, the power source E includes a rectifier circuit and a DC/DC converter. The rectifier circuit converts an alternating current of the commercial alternating power source to a direct current. The DC/DC converter increases the direct current from the rectifier circuit.

The inverter 11 includes four transistors Q1, Q2, Q3, Q4. These transistors constitute an IGBT (Insulate Gate Bipolar Transistor). The serial-connected transistors Q1, Q2 and the serial-connected transistors Q3, Q4 are parallel-connected to the power source E.

Capacitors C1–C4, which function as resonance circuit, are parallel-connected to the transistors Q1–Q4 respectively. Also, diodes D1–D4, which function as a flywheel circuit, are parallel-connected to the transistors Q1–Q4 respectively. Further, control signals S1–S4 from a controller 10 are input to the base of the transistors Q1–Q4 respectively.

The inverter circuit 11 includes a pair of output terminals A1, A2. The output terminal A1 is connected to the terminal A3 of a first coil T1 of a transformer T through the reactor L. The output terminal A2 is connected to the terminal A4 of the first coil T1.

Each transistor Q1–Q4 is ON/OFF controlled based on control signals S1–S4 from the controller 10. As a result, the direct current from the power source E is converted to an alternating current and applied to the first coil T1 of the transformer T.

The transformer T includes a second coil T2 arranged to face the first coil T1. The ratio between the number of turns of the first coil T1 and the number of turns of the second coil T2 is one to one. When an alternating current from the inverter 11 is applied to the first coil T1, an induced electromotive force is generated in the second coil T2.

A capacitor C, which functions as a booster circuit, is connected between a pair of terminals A5, A6 of the second coil T2. The terminals A5, A6 are respectively connected to input terminals A7, A8 of a rectifier circuit 12. The capacitor C and the reactor L constitute a resonance circuit and increase the induced electromotive force, that is, the alternating voltage generated in the second coil T2.

A rectifier circuit 12 includes four diodes D5, D6, D7, D8. These diodes D5–D8 form a bridge circuit. The rectifier circuit 12 rectifies the alternating voltage increased by the capacitor C to a direct current voltage Vc. The direct current voltage Vc is applied to a battery B through a fuse F. As a result, the battery B is charged. A smoothing capacitor C5 is connected between output terminals A9, A10 of the rectifier circuit 12. The smoothing capacitor C5 smoothes the direct current voltage Vc rectified in the rectifier circuit 12.

A first transistor Q5 is connected parallel to the diode D6 of the rectifier circuit 12. The first transistor Q5 includes a collector connected to the cathode of the diode D6 and an emitter connected to the anode of the diode D8. A second transistor Q6 is connected parallel to the diode D8. The second transistor Q6 includes a collector connected to the cathode of the diode D8 and an emitter connected to the anode of the diode D8. The first and second transistors Q5, Q6 are simultaneously ON/OFF controlled by a switch drive circuit 14.

Suppose the first and second transistors Q5, Q6 are both turned on when an induced electromotive force (alternating voltage) is being generated in the second coil T2. When the potential of the terminal A5 of the second coil T2 is higher than the potential of the terminal A6, the first transistor Q5 and the diode D8 function as a short circuit, and a closed circuit is formed. The closed circuit includes the first transistor Q5, the diode D8 and the second coil T2. On the other hand, when the potential of the terminal A5 is lower than the potential of the terminal A6, the second transistor Q6 and the diode D6 function as a short circuit, and a closed circuit is formed. The closed circuit includes the second transistor Q6, the diode D6 and the second coil T2.

A voltage detector circuit 13 is connected between the terminals A9, A10 of the rectifier circuit 12. The detector circuit 13 detects the direct current voltage Vc applied to the battery B for charging. When the detected direct current voltage is higher than or equal to a predetermined permissible value, the detector circuit 13 sends a signal S5 indicating the abnormality to the switch drive circuit 14. The permissible value is a maximum voltage value that does not damage the elements constituting the second circuit, that is, the capacitor C, the diodes D5–D8, the transistors Q5, Q6, and the smoothing capacitor C5. The permissible value has been obtained according to previous tests.

When inputting the abnormality signal S5, the switch drive circuit 14 sends a drive signal S6 to the base of the first and second transistors Q5, Q6 and turns on the transistors Q5, Q6. In other words, when the direct current voltage Vc output from the rectifier circuit 12 is higher than or equal to the permissible value, the transistors Q5, Q6 and the diodes D6, D8 function as a short circuit to short-circuit the terminals A5, A6 of the second coil T2.

Figure 2:
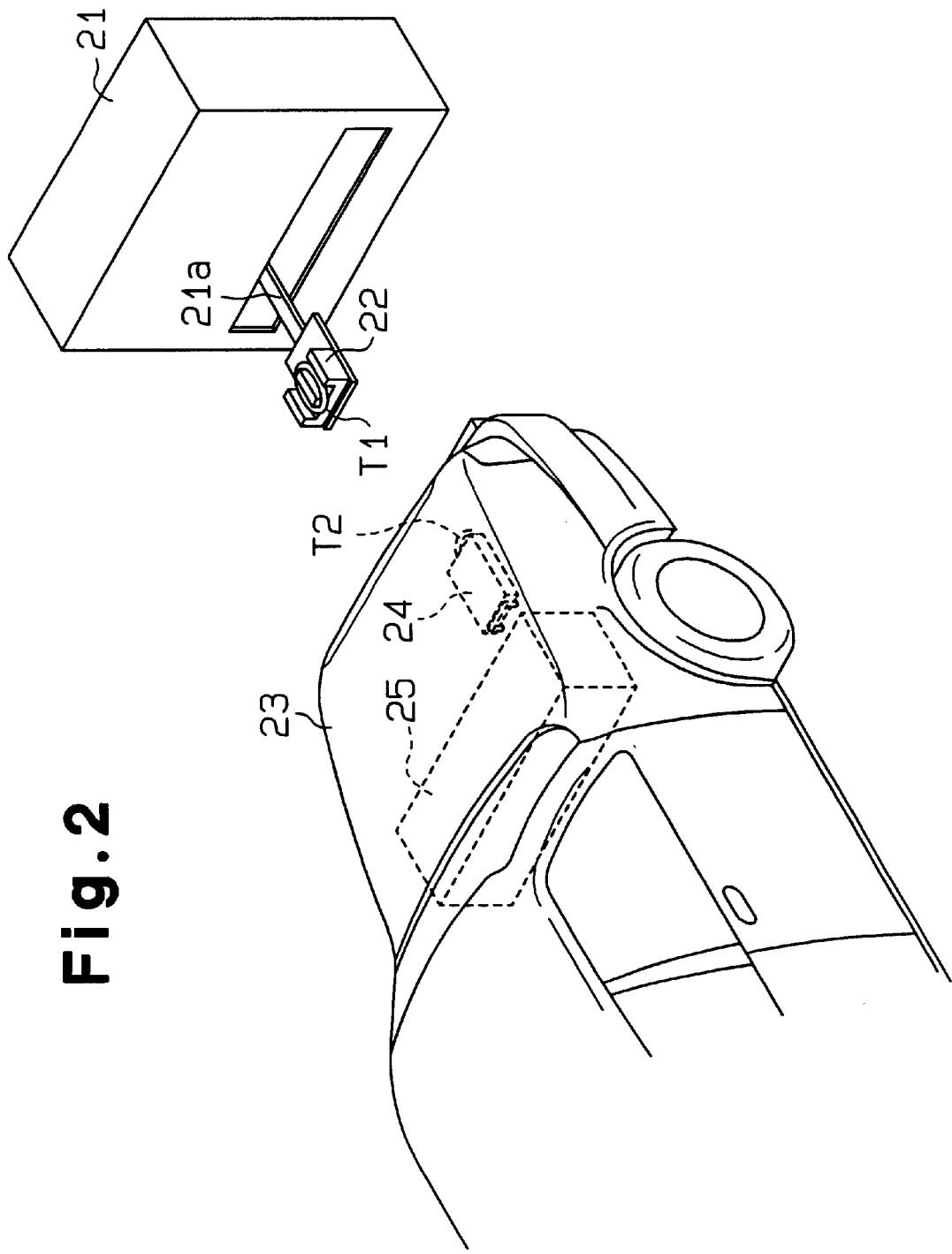
FIG. 2 is a perspective view showing a method for charging a battery of an electric vehicle using a charging apparatus of FIG. 1.

As shown in FIG. 2, the direct current power source E, the inverter 11, the reactor L, and the controller 10, which constitute the first circuit, are accommodated in a charge control box 21 provided on the ground. An arm 21a extends from the charge control box 21. A coupler 22 having the first coil T1 is attached to the distal end of the arm 21a.

The rectifier circuit 12, the capacitors C, C5, the detector circuit 13, and the switch drive circuit 14, which constitute the second circuit, are accommodated in an accommodation box 25 provided in an electric vehicle 23. The second coil T2 is provided in a coupler 24 located in the electric vehicle 23. Although not shown in FIG. 2, the battery B is installed in the electric vehicle 23.

The couplers 22, 24 are detachably joined by moving the arm 21a of the control box 21. When the couplers 22, 24 are joined, the first coil T1 faces the second coil T2 without contacting. The battery B is charged in this state.

That is, a direct current from the power source E is converted to an alternating current by the inverter circuit 11. When the alternating current is applied to the first coil T1 of the transformer T, an alternating voltage is generated between the terminals A5, A6 of the second coil T2. The alternating voltage is increased by the capacitor C. The increased alternating voltage is rectified by the rectifier circuit 12, and the direct current voltage Vc is applied to the battery B for charging.

If the fuse F is cut off for some reason, the capacitor C instantaneously increases the direct current voltage Vc. When the direct current voltage Vc reaches the permissible value, the detector circuit 13 sends the abnormality signal S5 to the switch drive circuit 14. When inputting the signal S5, the switch drive circuit 14 outputs the drive signal S6 to the first and second transistors Q5, Q6 and turns on the transistors Q5, Q6. Then, the transistors Q5, Q6 and the diodes D6, D8 short-circuit the terminals A5, A6 of the second coil T2. Accordingly, the voltage applied between the terminals A5, A6 turns instantaneously null and the capacitor C stops functioning as a booster circuit. The direct current voltage Vc between the output terminals A9, A10 of the rectifier circuit 12 turns null and does not exceed the permissible value.

Thus, the elements forming the second circuit, that is, the capacitor C, the diodes D5–D8, the transistors Q5, Q6, and the smoothing capacitor C5 do not suffer from a voltage that damages them.

An abnormal increase of voltage in the second circuit is prevented by the detector circuit 13, the switch drive circuit 14, and the transistors Q5, Q6, which are included in the second circuit, not in the first circuit. Therefore, an abnormal increase of voltage is more quickly and firmly prevented in comparison to when the operation of the first circuit is controlled in accordance with the operation of the second circuit.

The second circuit is located in the electric vehicle 23. As a result of firmly preventing the abnormal voltage increase in the second circuit, maintainability and reliability of the charging apparatus of the electric vehicle 23 improve.

The present invention can further be embodied as follows.

Figure 3:
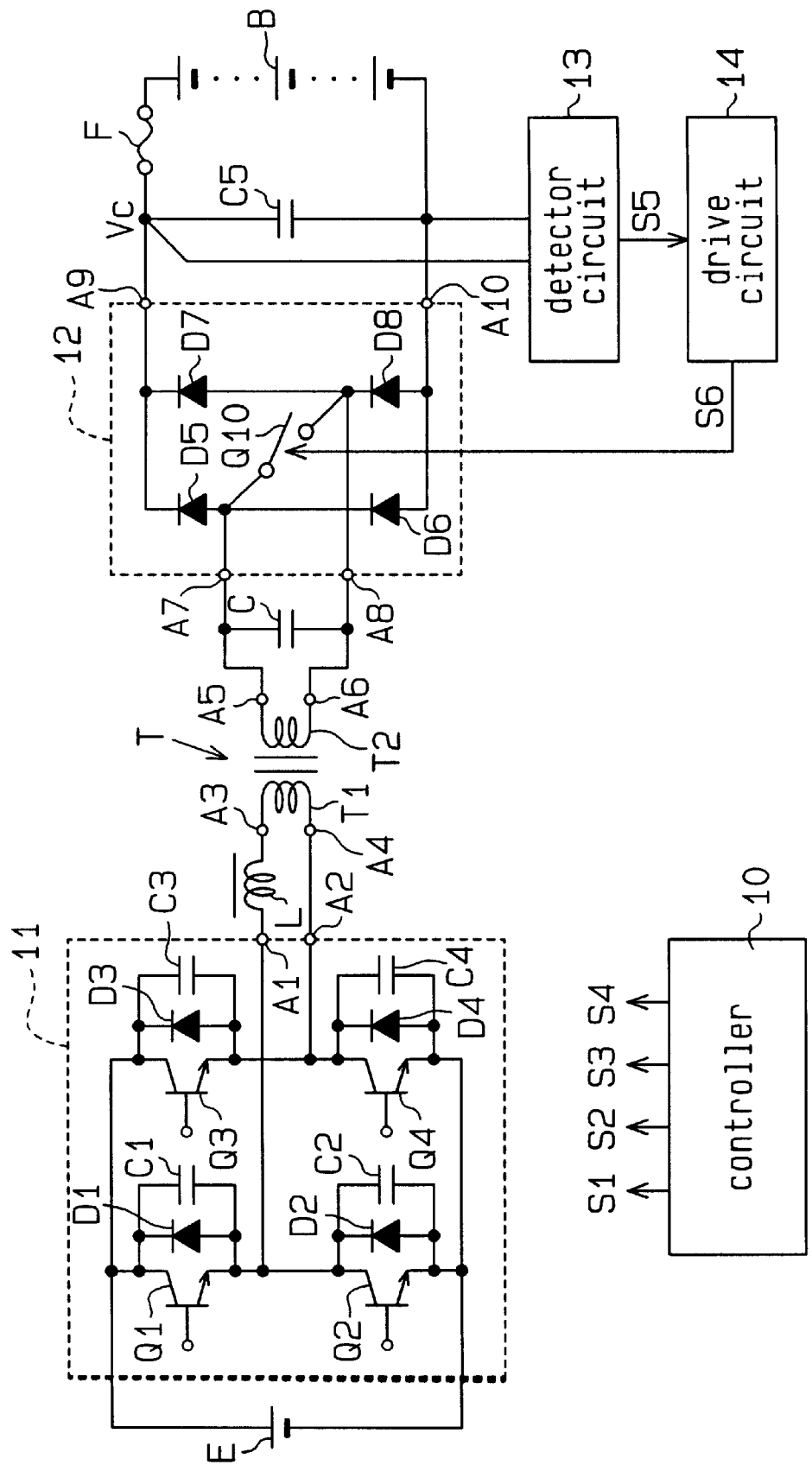
FIG. 3 is a circuit diagram of a charging apparatus according to a second embodiment of the present invention.

In a second embodiment shown in FIG. 3, a semiconductor switch Q10, which is a two way switch such as a triac, is connected between the input terminals A7, A8 of the rectifier circuit 12. The switch Q10, which functions as a short circuit, is closed by the drive signal S6 from the switch drive circuit 14 and forms a closed circuit with the second coil T2. A relay may be used in place of the semiconductor switch Q10.

In the embodiment shown in FIG. 2, the coil T1 faces the coil T2 without contacting when the couplers 22, 24 are joined, and charging is performed through the non-contact coils T1, T2. The present invention may, however be employed in charging apparatuses other than non-contact type charging apparatuses.

In the embodiment shown in FIG. 2, the second circuit is located in the electric vehicle 23. However, the second circuit may be located in the charge control box 21, and charging cords extending from the output terminals A9, A10 of the rectifier circuit 12 may be connected to the battery B in the vehicle 23. In this case, the first coil T1 and the second coil T2 may be integrally, inseparably formed.

The embodiment of FIG. 2 shows a charging apparatus for the automobile 23, however, the present invention may be employed with various vehicles such as trucks, buses, and forklifts. Further, the present invention may be employed in charging apparatuses for purposes other than vehicles.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A charging apparatus for charging based on an alternating voltage produced in a second coil of a transformer, wherein the second coil includes a pair of terminals, the charging apparatus comprising:

a booster circuit connected between the terminals of the second coil for increasing the alternating voltage produced in the second coil;

a rectifier circuit for rectifying the alternating voltage increased in the booster circuit to a direct current voltage for charging;

a monitor for monitoring the direct current voltage from the rectifier circuit, wherein the monitor outputs a drive signal when the direct current voltage is equal to or higher than a predetermined permissible value; and a short circuit for short-circuiting the terminals of the second coil in response to the drive signal from the monitor.

2. The charging apparatus according to claim 1, wherein the rectifier circuit includes four diodes that form a bridge circuit, the short circuit includes transistors respectively parallel-connected to two of the diodes, and wherein the transistors are turned on to short-circuit the terminals of the second coil in response to the drive signal from the monitor.

3. The charging apparatus according to claim 1, wherein the short circuit is a switch between the terminals of the second coil, and wherein the switch is closed to short-circuit the terminals of the second coil in response to the drive signal from the monitor.

4. The charging apparatus according to claim 1, wherein the monitor includes:

a detector for detecting the direct current voltage from the rectifier circuit, the detector outputting a signal to indicate the abnormality when the detected voltage is equal to or higher than the permissible value; and a drive circuit for outputting the drive signal to the short circuit in response to the abnormality signal from the detector.

5. The charging apparatus according to claim 1, which is located in a vehicle having a battery, wherein the rectifier circuit applies a direct current voltage to the battery for charging.

6. The charging apparatus according to claim 1 further comprising:

a direct current power source;

an inverter for converting a direct current from the power source into an alternating current; and a first coil forming a part of a transformer, wherein the second coil produces the alternating voltage when the alternating current from the inverter is applied to the first coil.

7. The charging apparatus according to claim 6 further comprising:

a first circuit including the direct current power source, the inverter, and the first coil; and a second circuit including the second coil, the booster circuit, the rectifier circuit, the monitor, and the short circuit, wherein the first circuit and the second circuit is detachably joined through the coils.

8. The charging apparatus according to claim 7, wherein the first circuit is located in a charge control box located in a predetermined place and the second circuit is installed in a vehicle having a chargeable battery.

9. The charging apparatus according to claim 6, wherein the booster circuit includes a capacitor.

10. The charging apparatus according to claim 9 further comprising a reactor connected to the first coil, wherein the reactor and the capacitor forms a resonance circuit.

11. A charging apparatus for charging a battery, the charging apparatus comprising:

a direct current power source;

an inverter for converting a direct current from the power source into an alternating current;

a transformer including a first coil and a second coil, wherein the second coil produces an alternating voltage when the alternating current from the inverter is applied to the first coil, and wherein the second coil has a pair of terminals;

a booster circuit connected between the terminals of the second coil for increasing the alternating voltage produced in the second coil;

a rectifier circuit for rectifying the alternating voltage increased in the booster circuit to a direct current voltage, the rectifier circuit applying the direct current voltage to the battery for charging;

a monitor for monitoring the direct current voltage from the rectifier circuit, wherein the monitor outputs a drive signal when the direct current voltage is equal to or higher than a predetermined permissible value;

a short circuit for short-circuiting the terminals of the second coil in response to the drive signal from the monitor;

a first circuit including the direct current power source, the inverter, and the first coil; and a second circuit including the second coil, the booster circuit, the rectifier circuit, the monitor, and the short circuit, wherein the first circuit and the second circuit are detachably joined through the coils.

12. The charging apparatus according to claim 11, wherein the rectifier circuit includes four diodes forming a bridge circuit, and the short circuit includes transistors respectively parallel-connected to two diodes, and wherein the transistors are turned on to short-circuit the terminals of the second coil in response to the drive signal from the monitor.

13. The charging apparatus according to claim 11, wherein the short circuit is a switch connected between the terminals of the second coil, wherein the switch is closed to short-circuit the terminals of the second coil in response to the drive signal from the monitor.

14. The charging apparatus according to claim 11, wherein the monitor includes:

a detector located between the rectifier circuit and the battery for detecting a direct current voltage from the rectifier circuit, wherein the detector outputs a signal indicating the abnormality when the detected direct current voltage is equal to or higher than the permissible value; and a drive circuit for outputting the drive signal to the short circuit in response to the abnormality signal from the detector.

15. The charging apparatus according to claim 14, wherein the first circuit is located in a charge control box located in a predetermined place and the second circuit is installed in a vehicle having the chargeable battery.

16. The charging apparatus according to claim 11 further comprising a circuit breaker that cuts off the rectifier circuit from the battery when an excessive current flows from the rectifier circuit to the battery.

17. A method for charging a battery based on an alternating voltage produced in a second coil of a transformer, wherein the second coil includes a pair of terminals, the method comprising steps of:

increasing the alternating voltage produced in the second coil with a booster circuit;

rectifying the alternating voltage increased by the booster circuit into a direct current voltage with a rectifier circuit, the rectifier circuit applying the direct current voltage to the battery for charging;

monitoring the direct current voltage produced by the rectifier circuit to determine if the direct current voltage exceeds a predetermined value;

generating a drive signal when the direct current voltage exceeds the predetermined value, as determined by the monitoring step; and short circuiting the terminals of the second coil in response to the drive signal.

18. A method for charging a battery, the method comprising steps of:

converting a direct current from a direct current power source into an alternating current with an inverter;

applying the alternating current generated by the inverter to a first coil of a transformer such that a second coil of the transformer produces an alternating voltage;

increasing the alternating voltage produced in the second coil with a booster circuit;

rectifying the increased alternating voltage produced by the booster circuit into a direct current voltage with a rectifier circuit;

applying the direct current from the rectifier to a battery for charging;

monitoring the direct current voltage from the rectifier circuit to determine if the direct current voltage is equal to or higher than a predetermined permissible voltage; and short-circuiting a pair of terminals of the second coil when the direct current voltage is equal to or higher than the predetermined permissible voltage, as determined by the monitoring step.

* * * * *

UNITED STATES PATENT AND TRADEMARK OFFICE
CERTIFICATE OF CORRECTION

PATENT NO. : 6,037,745
DATED : March 14, 2000
INVENTOR(S) : Yasuhiro Koike et al.

It is certified that error appears in the above-identified patent and that said Letters Patent is hereby corrected as shown below:

On the title page, under [73] Assignees: The first listed Assignee should be Kabushiki Kaisha Toyoda Jidoshokki Seisakusho.

Signed and Sealed this

Fifteenth Day of August, 2000

Attest:

Q. TODD DICKINSON

*Attesting Officer*  *Director of Patents and Trademarks*